United States Patent
Soni

(10) Patent No.: US 11,602,974 B2
(45) Date of Patent: Mar. 14, 2023

(54) SYSTEM AND METHOD FOR GENERATING MAP DATA ASSOCIATED WITH ROAD OBJECTS

(71) Applicant: HERE GLOBAL B.V., Eindhoven (NL)

(72) Inventor: Abhilshit Soni, Gujarat (IN)

(73) Assignee: HERE Global B.V., Eindhoven (NL)

(*) Notice: Subject to any disclaimer, the term of this patent is extended or adjusted under 35 U.S.C. 154(b) by 752 days.

(21) Appl. No.: 16/555,670

(22) Filed: Aug. 29, 2019

(65) Prior Publication Data
US 2021/0061064 A1    Mar. 4, 2021

(51) Int. Cl.
*G01C 21/00* (2006.01)
*B60H 1/00* (2006.01)
(Continued)

(52) U.S. Cl.
CPC .......... *B60H 1/00771* (2013.01); *G01C 21/32* (2013.01); *G01C 21/367* (2013.01);
(Continued)

(58) Field of Classification Search
CPC ............ B60H 1/00771; G01C 21/32; G01C 21/3644; G01C 21/367; G01C 21/3815;
(Continued)

(56) References Cited

U.S. PATENT DOCUMENTS 6,411,894 B2    6/2002  Yamamoto et al.
6,608,913 B1 *  8/2003  Hinton ............... B82Y 15/00
                                                      382/104
(Continued)

FOREIGN PATENT DOCUMENTS

CA    3030513 A1 *  7/2019 ............ G01S 17/89
CN    204946114 U    1/2016

OTHER PUBLICATIONS

Chen et al., "Automated and Efficient Extraction of Highway Tunnel Lining Cross-sections Using Terrestrial Laser Scanning (TLS)", Lasers in Eng., vol. 39, retrieved from http://www.oldcitypublishing.com/wp-content/uploads/2018/03/LIEv39n3-6p341-353Chen.pdf, pp. 341-353.

(Continued)

*Primary Examiner* — Tyler J Lee
*Assistant Examiner* — Tiffany P Ohman
(74) *Attorney, Agent, or Firm* — Ditthavong, Steiner & Mlotkowski

(57) ABSTRACT

A method, a system, and a computer program product may be provided for generating map data associated with one or more objects in a region. The method includes receiving point cloud data associated with the region. The method further includes generating a georeferenced top down raster image of the region, based on the point cloud data. The georeferenced top down raster image is indicative of a top surface of each of the one or more objects. The method further includes determining boundary data of the top surface of each of the one or more objects, based on the georeferenced top down raster image and generating the map data associated with the one or more objects, based on the boundary data of the top surface of each of the one or more objects.

16 Claims, 10 Drawing Sheets

(51) Int. Cl.
  *G01C 21/32* (2006.01)
  *G01C 21/36* (2006.01)
  *G06T 1/00* (2006.01)
  *H04W 4/021* (2018.01)

(52) U.S. Cl.
  CPC ........ *G01C 21/3644* (2013.01); *G06T 1/0007* (2013.01); *H04W 4/021* (2013.01); *G06T 2207/10028* (2013.01)

(58) Field of Classification Search
  CPC ........... G06T 2207/10028; G06T 2207/20036; G06T 2207/20081; G06T 2207/20084; G06T 7/11; G06T 1/0007; H04W 4/021
  See application file for complete search history.

(56) References Cited

U.S. PATENT DOCUMENTS

| | | |
|---|---|---|
| 8,886,461 B2 | 11/2014 | Twardowski |
| 2012/0095682 A1* | 4/2012 | Wilson ................ G01C 21/32 701/532 |
| 2016/0379488 A1 | 12/2016 | Fowe et al. |
| 2019/0279420 A1* | 9/2019 | Moreno ................ G06V 20/64 |

OTHER PUBLICATIONS

Gargoum et al., "Automated Inventory of Overhead Assets on Highways Using Mobile LiDAR Data", 2017, retrieved on Aug. 29, 2019 from https://www.tac-atc.ca/sites/default/files/conf_papers/gargoum_s_-_automated_inventory_of_overhead_assets_on_highways_using_mobile_lidar_data.pdf, pp. 1-14.

* cited by examiner

SYSTEM AND METHOD FOR GENERATING MAP DATA ASSOCIATED WITH ROAD OBJECTS

TECHNOLOGICAL FIELD

The present disclosure generally relates to generating map data, and more particularly relates to generating map data associated with road objects, such as tunnels, dividers, bridges, flyovers, roundabout in a region.

BACKGROUND

Currently, map developers and navigation service providers face many challenges in determining the speed of vehicles or access real-time traffic conditions of the vehicles which travel through tunnels, bridges, flyovers etc. Often, due to insufficient strength of GPS signals inside or around such road objects, map developers are unable to determine exact location and geometry of such road objects. Due to this, navigation services provided to users of such mapping platforms suffers from lack of precise data indicative of the road objects. As such, vehicles may not be able to fully comply with the speed restriction requirements, lane rules, and other compliances when traversing through or across such road objects.

Information about presence of map features like the tunnels, bridges, dividers, roundabouts etc. and the geometry of such map features are valuable attributes for a map which is usually accessed by end users using navigation devices or mobile apps. Usually the presence of such map features has to be geo-coded manually by geocoders updating a map by referring the street images of surrounding area. However, such manual geo-coding may not be a feasible and scalable process. Further, such a process does not reflect true status of the map features and accordingly cannot be used for providing dynamic and real-time navigation assistance to vehicles.

SUMMARY

Accordingly, there is a need for automating the process of geo-coding map features so as to realize a feasible, scalable, and reliable mapping platform. A system, a method, and a computer program product are provided in accordance with an example embodiment described herein for generating map data associated with road objects in a region.

Embodiments disclosed herein may provide a system for generating map data associated with each of one or more objects in a region. The system may include a memory configured to store instructions, and a processor configured to execute the instructions to at least: receive point cloud data associated with the region, generate a georeferenced top down raster image of the region, based on the point cloud data, wherein the georeferenced top down raster image is indicative of a top surface of each of the one or more objects, determine boundary data of the top surface associated with each of the one or more objects, based on the georeferenced top down raster image, and generate the map data associated with each of the one or more objects based on the boundary data of the top surface associated with each of the one or more objects. The processor may be further configured to filter one or more points of the point cloud data falling below a threshold height from a ground level to obtain height filtered point cloud data, generate the georeferenced top down raster image, based on the height filtered point cloud data. The processor may be further configured to identify, a boundary of the top surface of each of the one or more objects from the georeferenced top down raster image, based on one or more of a semantic image segmentation deep learning model or at least one standard computer vision filtering technique.

The processor may be further configured to determine a median of the top surface associated with each of the one or more objects and determine one or more of a centerline geometry, a start point, and an end point of the top surface associated with each of the one or more objects, based on the median. The processor may be further configured to receive GPS probe data associated with each of the one or more objects, determine trace of one or more devices within the boundary data associated with each of the one or more objects, based on the GPS probe data, and determine a direction of travel associated with each of the one or more objects, based on the trace of the one or more devices. The one or more objects may include one or more of a tunnel, a divider, a bridge, a flyover, or a roundabout. The processor may be further configured to determine a speed limit associated with each of the one or more objects based on speed captured in the GPS probe data.

The processor may be further configured to obtain map data associated with the region and update the map data of the region with the generated map data of the one or more objects.

Embodiments of the present invention may provide a method for generating map data associated with each of one or more objects in a region. The method includes receiving point cloud data associated with the region, generating a georeferenced top down raster image of the region, based on the point cloud data, wherein the georeferenced top down raster image is indicative of a top surface of each of the one or more objects, determining, boundary data of the top surface associated with each of the one or more objects, based on the georeferenced top down raster image. The method may include generating the map data associated with the one or more objects, based on the boundary data of the top surface of each of the one or more objects. The method may further include filtering one or more points of the point cloud data falling below a threshold height from a ground level to obtain height filtered point cloud data and generating the georeferenced top down raster image, based on the height filtered point cloud data. The method may further include identifying, a boundary of the top surface of each of the one or more objects from the georeferenced top down raster image, based on one or more of a semantic image segmentation deep learning model or at least one standard computer vision filtering technique.

The method further includes determining a median of the top surface associated with each of the one or more objects and determining one or more of a centerline geometry, a start point, and an end point of the top surface associated with each of the one or more objects, based on the median. The method further includes receiving GPS probe data associated with each of the one or more objects, determining trace of one or more devices within the boundary data associated with each of the one or more objects, based on the GPS probe data and determining a direction of travel associated with each of the one or more objects, based on the trace of the one or more devices. The method further includes determining a speed limit associated with each of the one or more objects based on speed captured in the GPS probe data.

The method may include obtaining map data of the region and updating the map data of the region with the generated map data of the one or more objects.

Embodiments of the present invention may provide a computer program product including at least one non-transitory computer-readable storage medium having computer-executable program code instructions stored therein. The computer-executable program code instructions when executed by a computer, cause the computer to carry out operations for generating map data associated with each of one or more objects in a region, the operations including: receiving point cloud data associated with the region, generating a georeferenced top down raster image of the region, based on the point cloud data, wherein the georeferenced top down raster image is indicative of a top surface of each of the one or more objects, determining, boundary data of the top surface associated with each of the one or more objects, based on the georeferenced top down raster image, generating the map data associated with each of the one or more objects based on the boundary data of the top surface associated with each of the one or more objects.

According to some embodiments, the operations further include: filtering one or more points of the point cloud data falling below a threshold height from a ground level to obtain height filtered point cloud data; and generating the georeferenced top down raster image, based on the height filtered point cloud data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
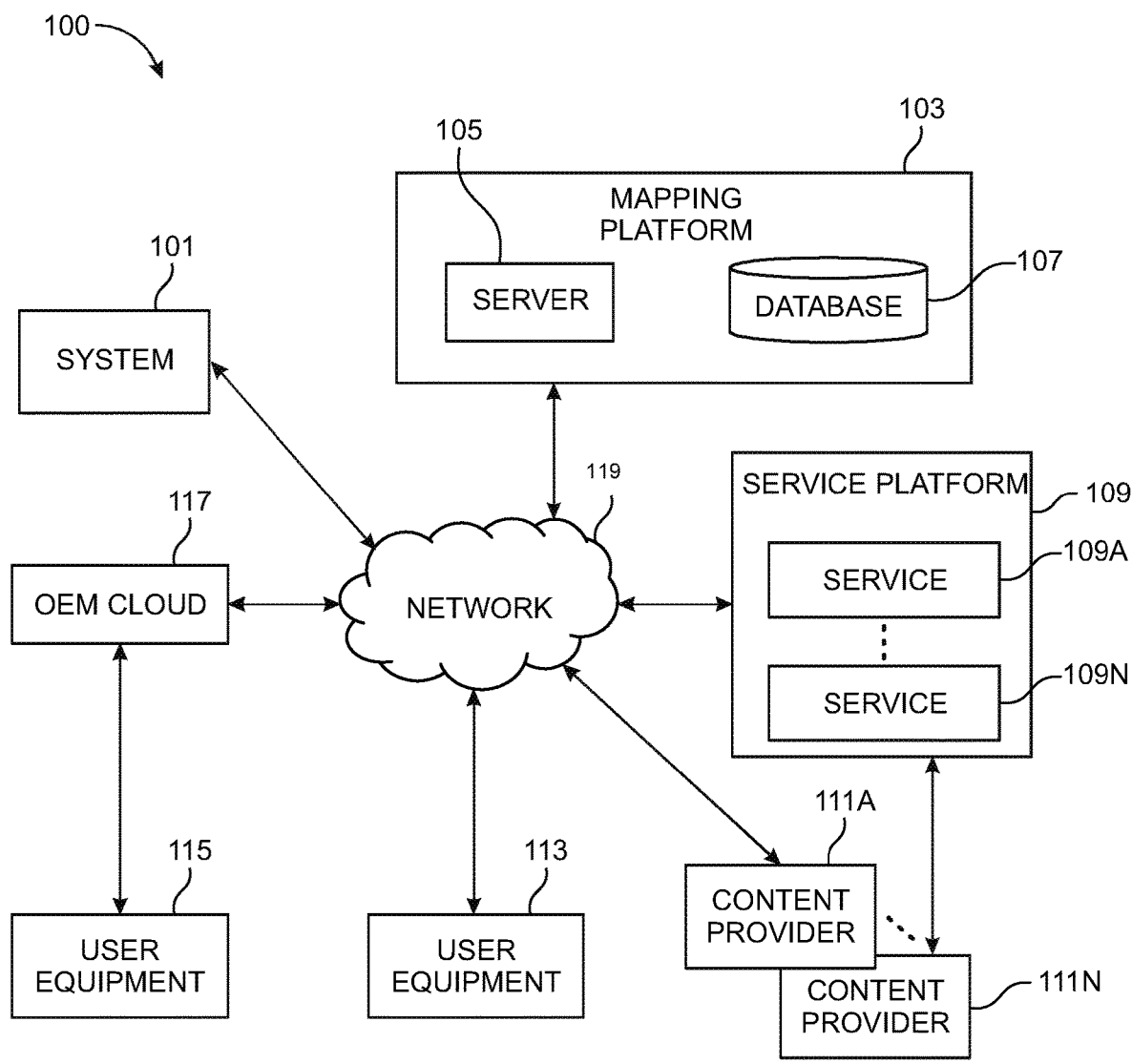
Figure 2:
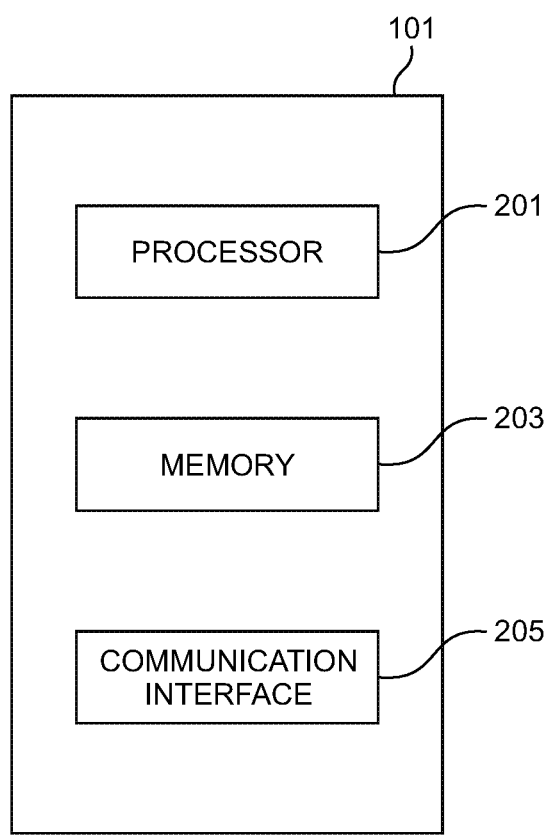
Figure 4:
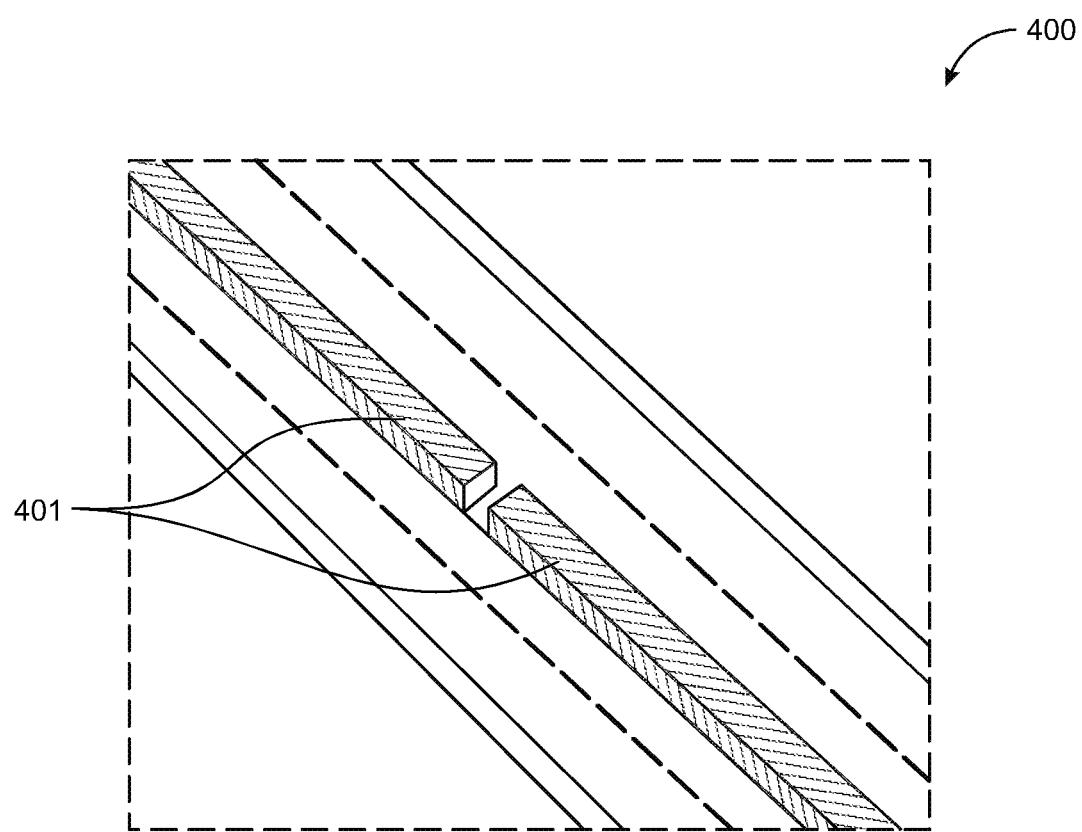
Figure 5:
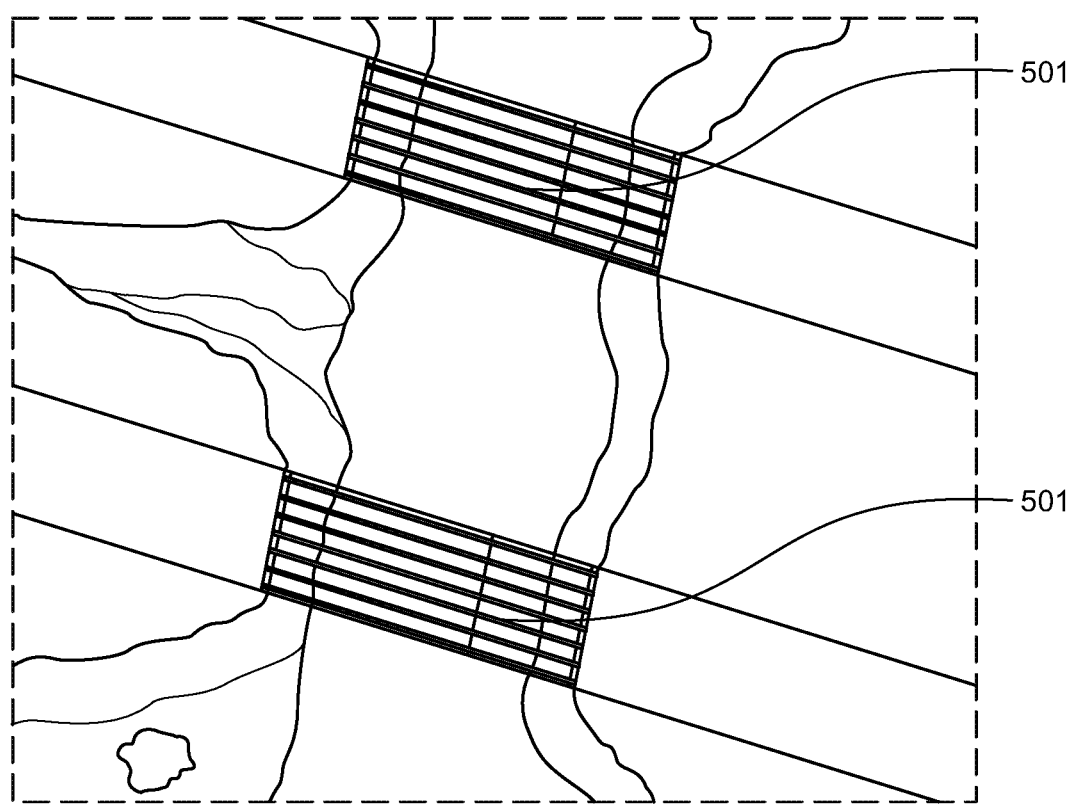
Figure 6:
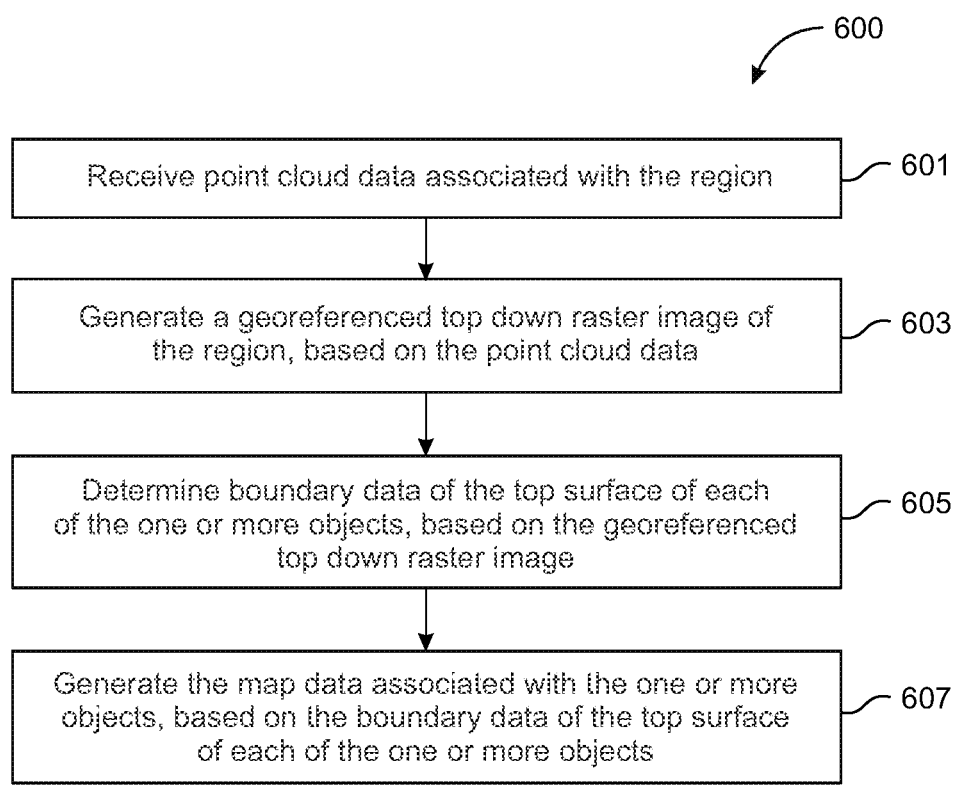

Having thus described example embodiments of the invention in general terms, reference will now be made to the accompanying drawings, which are not necessarily drawn to scale, and wherein:

FIG. 1 illustrates a block diagram of a network environment for generating map data associated with one or more objects in a region, in accordance with an example embodiment;

FIG. 2 illustrates a block diagram of the system, exemplarily illustrated in FIG. 1, for generating map data associated with the one or more objects in a region, in accordance with an example embodiment;

FIGS. 3A-3E illustrate a illustrate a schematic diagram for an exemplary scenario for implementation of the system, exemplarily illustrated in FIG. 1, for generating the data map data associated with the tunnel, in accordance with an example embodiment;

FIG. 4 illustrates an exemplary scenario for generation of map data associated with a divider that is a part of a route, in accordance with an embodiment of the disclosure;

FIG. 5 illustrates a diagram for an exemplary scenario for implementation of the system to generate the data map data associated with each of the one or more bridges, in accordance with an embodiment of the disclosure; and FIG. 6 exemplarily illustrates a flowchart for implementation of an exemplary method for generating map data associated with one or more objects in a region, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "road object" may refer to a traversable map feature having a top surface above a ground level and through which vehicles may traverse along at least one direction. The road object may for example, be a tunnel, a bridge, an underpass, or a roundabout.

The term "road sign" may be used to refer to any traffic or non-traffic related sign, such as a speed limit sign, a distance indicating sign, a destination sign board, a diversion sign, a warning sign, a toll indicating sign, a lane indicating sign, a sign showing a curvature ahead, a sign showing a sharp turn, a sign showing static and/or dynamic speed limits and the like.

The term "route" may be used to refer to a path from a source location to a destination location on any link.

The term 'autonomous vehicle' may be used to refer to any vehicle having autonomous driving capabilities at least in some conditions. An autonomous vehicle, as used throughout this disclosure, may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.
End of Definitions A method, a system, and a computer program product may be provided for generating map data associated with one or more objects in a region. Embodiments of the present disclosure may provide a system for automating the process of geo-coding of map-features using LiDAR data (also referred to as LIDAR data). A georeferenced top down raster image of a region may be generated using the LiDAR point cloud data. The georeferenced top down raster image is indicative of a top surface of each map feature (also referred to as one or more objects). Boundary data of the top surface of each of the one or more objects may be determined based on the georeferenced top down raster image and accordingly, map data associated with the one or more objects may be generated, based on the boundary data of the top surface of each of the one or more objects. Embodiments of the present disclosure may thus provide an automated process and machine for geo-coding the map features. These and other technical improvements of the invention will become evident from the description provided herein.

FIG. 1 illustrates a block diagram of a network environment 100 for generating map data associated with one or more objects in a region, in accordance with an example embodiment. The network environment 100 may comprise a system 101, a mapping platform 103, a service platform 109, a plurality of content providers 111A . . . 111N, user equipment (UE) 113 and 115, an OEM cloud 117 and a network 119. The system 101 may be communicatively coupled to the mapping platform 103, via the network 119. The mapping platform 103 may include a server 105 and a database 107. Further, the server 105 and the database 107 may be communicatively coupled to each other. The service platform 109 may comprise a plurality of services 109A . . . 111N. The mapping platform 103 may be communicatively coupled to the services platform 109 and the plurality of content providers 111A . . . 111N, via the network 119. Further, the services platform 109 and the plurality of content providers 111A . . . 111N may be communicatively coupled to each other. In some example embodiments, a user equipment such as the user equipment 113 may be communicatively coupled to the mapping platform 103, directly via the network 119. Additionally or alternately, in some example embodiments, a user equipment such as the user equipment 115 may be communicatively connected to the OEM cloud 117 which in turn may be accessible to the mapping platform 103 via the network 119. All the components in the network environment 100 may be coupled directly or indirectly to the network 119. The components described in the network environment 100 may be further broken down into more than one component and/or combined together in any suitable arrangement. Further, one or more components may be rearranged, changed, added, and/or removed. Furthermore, fewer or additional components may be in communication with the system 101 within the scope of this disclosure.

The system 101 may be embodied in one or more of several ways as per the required implementation. For example, the system 101 may be embodied as a cloud based service or a cloud based platform. As such, the system 101 may be configured to operate outside the user equipment 113 and/or 115. However, in some example embodiments, the system 101 may be embodied within the user equipment 113, 115, for example as part of an in-vehicle navigation system. In each of such embodiments, the system 101 may be communicatively coupled to the components shown in FIG. 1 to carry out the desired operations and wherever required modifications may be possible within the scope of the present disclosure.

The mapping platform 103 may comprise suitable logic, circuitry, interfaces and code that may be configured to generate the map data associated with the one or more objects in the region. The server 105 of the mapping platform 103 may comprise processing means and communication means. For example, the processing means may comprise one or more processors configured to process requests received from the system 101 and/or the user equipment 113, 115. The processing means may fetch map data from the database 107 and transmit the same to the system 101 and/or the user equipment 113, 115 in a suitable format. In one or more example embodiments, the mapping platform 103 may periodically communicate with the user equipment 113, 115 via the processing means to update a local cache of the map data stored on the user equipment 113, 115. Accordingly, in some example embodiments, map data may also be stored on the user equipment 113, 115 and may be updated based on periodic communication with the mapping platform 103.

The mapping platform 103 may comprise the database 107 for storing map data of one or more geographic regions such as a city, province, country or of the entire world. The database 107 may store point cloud data collected from the user equipment 113 and/or 115. The database 107 may store node data, road segment data, link data, point of interest (POI) data, link identification information, heading value records or the like. The database 107 may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 107 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 107 may also store data about the POIs and their respective locations in the POI records. The database 107 may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the database 107 may include event data (e.g., traffic incidents, construction activities, scheduled events, unscheduled events, accidents, diversions etc.) associated with the POI data records or other records of the database 107. Optionally or additionally, the database 107 may store 3D building maps data (3D map model of objects) of structures surrounding roads and streets.

The database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 113, 115. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 107 may be a master geographic database, but in alternate embodiments, the database 107 may be embodied as a client-side map database and may represent a compiled navigation database that may be used in or with end user devices to provide navigation and/or map-related functions. In such a case, the database 107 may be downloaded or stored on the user equipment 113, 115. The services platform 109 may provide navigation related functions and the plurality of services 109A . . . 109N to the user equipment 113, 115. The plurality of services 109A . . . 109N may include navigation functions, speed adjustment functions, traffic related updates, weather related updates, warnings and alerts, parking related services and indoor mapping services. In accordance with an embodiment, the plurality of services 109A . . . 109N may be provided by the plurality of content providers 111A . . . 111N. In some examples, the plurality of content providers 111A . . . 111N may access various Software Development Kits (SDKs) from the services platform 109 for implementation of the plurality of services 109A . . . 109N. In accordance with an embodiment, the services platform 109 and the mapping platform 103 may be integrated into a single platform to provide a suite of mapping and navigation related applications for OEM devices, such as the user equipment 115. The user equipment 113, 115 may be configured to interface with the services platform 109, the plurality of content provider 111A . . . 111N, and the mapping platform 103 over the network 119. Thus, the mapping platform 103 and the services platform 109 may enable provision of cloud-based services for the user equipment 113, 115, such as, storing the sensor data in the OEM cloud 117 in batches or in real-time and retrieving the stored sensor data for determining boundary data of the top surface of each of the one or more objects.

The plurality of content providers 111A . . . 111N may be configured to maintain data stored in the database 107. The plurality of content provider 111A . . . 111N such as a map developer may maintain the mapping platform 103. By way of example, the map developer may collect geographic data to generate and enhance the mapping platform 103. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. Crowdsourcing may be based on gathering data using customer vehicles. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform the database 107 of features within an environment that are appropriate for mapping. For example, motion sensors, inertia sensors, image capture sensors, proximity sensors, LiDAR (light detection and ranging) sensors, ultrasonic sensors etc. The gathering of large quantities of crowd-sourced data may facilitate the accurate modeling and mapping of an environment, whether it is a road segment, a road sign or the interior of a multi-level parking structure. Also, remote sensing, such as aerial or satellite photography, may be used to generate map geometries directly or through machine learning as described herein.

The user equipment 113, 115 may be any user accessible device such as a mobile phone, a smartphone, a portable computer, and the like that is portable in itself or as a part of another portable/mobile object such as a vehicle. The user equipment 113, 115 may comprise a processor, a memory and a communication interface. The processor, the memory and the communication interface may be communicatively coupled to each other. In some example embodiments, the user equipment 113, 115 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. As such, the user equipment 113, 115 may be an autonomous semi-autonomous vehicle or a manually driven vehicle. In such example embodiments, the user equipment 113, 115 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 113, 115. Additional, different, or fewer components may be provided. For example, the user equipment 113, 115 may be configured to execute and run mobile applications such as a messaging application, a browser application, a navigation application, and the like. At least one user equipment such as user equipment 113 may be directly coupled to the system 101 via the network 119. For example, the user equipment 113 may be a dedicated vehicle (or a part thereof) for gathering data for development of the map data in the database 107. In some example embodiments, at least one user equipment such as the user equipment 115 may be coupled to the system 101 via the OEM cloud 117 and the network 119. For example, the user equipment 115 may be a consumer vehicle (or a part thereof) and may be a beneficiary of the services provided by the system 101. In some example embodiments, one or more of the user equipment 113 and 115 may serve the dual purpose of a data gatherer and a beneficiary device. The user equipment 113 or 115 may be configured to capture sensor data associated with a road which the user equipment 113, 115 may be traversing. The sensor data may for example be image data of road objects, road signs, or the surroundings (for example buildings).

The sensor data may refer to sensor data collected from a sensor unit in the user equipment 113 or user equipment 115. In accordance with an embodiment, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LiDAR point cloud data may include point measurements from real-world objects or photos for a point cloud data that may then be translated to a 3D mesh or NURBS or CAD model. In accordance with an embodiment, the sensor data may be converted to units and ranges compatible with the mapping platform 103, to accurately receive the sensor data.

The network 119 may comprise suitable logic, circuitry, and interfaces that may be configured to provide a plurality of network ports and a plurality of communication channels for transmission and reception of data, such as the sensor data, map data from the database 107, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 119 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 119 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 2 illustrates a block diagram 200 of the system 101, exemplarily illustrated in FIG. 1, for generating map data associated with the one or more objects in a region, in accordance with an example embodiment. FIG. 2 is described in conjunction with elements from FIG. 1. The system 101 may include one or more processors, such as a processor 201, a memory 203, and a communication interface 205.

The processor 201 may comprise suitable logic, circuitry, and interfaces that may be configured to execute instructions stored in the memory 203. The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. The processor 201 may be configured to generate the map data associated with the one or more objects in the region. In some example embodiments, the processor 201 may receive the point cloud data from the database 107. In some example embodiments, the processor 201 may generate a georeferenced top down raster image of the region, based on the point cloud data. The georeferenced top down raster image is indicative of a top surface of each of the one or more objects. The processor 201 may further determine boundary data of the top surface of each of the one or more objects, based on the georeferenced top down raster image. The processor 201 may be configured to generate the map data associated with each of the one or more objects based on the boundary data of the top surface of each of the one or more objects.

Examples of the processor 201 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 201 may implement a number of processor technologies known in the art such as a machine learning model, a deep learning model, such as a recurrent neural network (RNN), a convolutional neural network (CNN), and a feed-forward neural network, or a Bayesian model. As such, in some embodiments, the processor 201 may include one or more processing cores configured to perform independently. A multi-core processor may enable multiprocessing within a single physical package.

Additionally or alternatively, the processor 201 may include one or more processors configured in tandem via the bus to enable independent execution of instructions, pipelining and/or multithreading. Additionally or alternatively, the processor 201 may include one or processors capable of processing large volumes of workloads and operations to provide support for big data analysis. However, in some cases, the processor 201 may be a processor specific device (for example, a mobile terminal or a fixed computing device) configured to employ an embodiment of the disclosure by further configuration of the processor 201 by instructions for performing the algorithms and/or operations described herein.

The memory 203 may comprise suitable logic, circuitry, and interfaces that may be configured to store a machine code and/or instructions executable by the processor 201. The memory 203 may be non-transitory and may include, for example, one or more volatile and/or non-volatile memories. For example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to store information including processor instructions for generate the map data associated with the one or more objects. Examples of implementation of the memory 203 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The communication interface 205 may comprise input interface and output interface for supporting communications to and from the user equipment 113, 115 or any other component with which the system 101 may communicate. The communication interface 205 may be any means such as a device or circuitry embodied in either hardware or a combination of hardware and software that is configured to receive and/or transmit data to/from a communications device in communication with the user equipment 113, 115. In this regard, the communication interface 205 may include, for example, an antenna (or multiple antennae) and supporting hardware and/or software for enabling communications with a wireless communication network. Additionally or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

The system 101 may be configured to transform, process, and execute upon the point cloud data to identify the each of the one or more objects associated with the region. The point cloud data may correspond to one or more objects associated with the region. In accordance with an embodiment, the point cloud data may include a list of points containing X, Y, and Z coordinates in a Cartesian coordinate system which is then projected to World Geodetic System (WGS84) by using the GPS location of a sensor as a reference. The list of X, Y, Z, and intensity in the Cartesian coordinate system may be converted to a list of longitude, latitude, altitude and intensity. In some example embodiments, the point cloud data may include an RGB value corresponding to each point. In some example embodiments, each point of the point cloud data may include a list of longitude, latitude, altitude, intensity, red, green and blue values.

In accordance with an embodiment, the processor 201 may be configured to generate a georeferenced top down raster image of the region, based on the point cloud data. The processor 201 may filter one or more points of the point cloud data which are falling below a threshold height from a ground level to obtain height filtered point cloud data. The height filtered point cloud data may include the points which are above the ground level. Further, the processor 201 may be configured to generate the georeferenced top down raster image, based on the height filtered point cloud data. The georeferenced top down raster image may indicate a top surface of the each of the one or more objects. Any suitable technique may be used to create the georeferenced top down raster image from the point cloud data. For example, a gridding technique may be used to create the georeferenced top down raster image from the point cloud data. In the gridding technique, a grid may be placed on top of the point cloud data in geographic space. Each cell in the grid has the same spatial dimensions. These dimensions may represent that particular area on the ground.

In accordance with an embodiment, the georeferenced top down raster image is a form of gridded data that may be stored as a grid of values which may be rendered on the system 101 as pixels. Each pixel represents an area of land on the ground. The represented area may be defined by spatial resolution of the georeferenced to down raster. In some example embodiments, the spatial resolution of the georeferenced top down raster is the area that each pixel represents on the ground. In some example embodiments, a 1-meter resolution raster means that each pixel represents a 1 m by 1 m area on the ground and each pixel in this case may contain points falling within a 1 m×1 m block on the ground surface.

In some example embodiments, for example, to derive a 1 m resolution raster from the point cloud data, a 1 m by 1 m grid may be overlaid over the points in the point cloud data. Within each 1 m×1 m cell, a value to be applied to that cell may be calculated, using the points found within that cell. Further, a max, a min or a mean height, and an intensity value of all points in the point cloud data within the 1 m cell may be taken to determine the top surface of the one or more objects.

In accordance with an embodiment, the processor 201 may be configured to determine the boundary data of the top surface of each of the one or more objects, based on the georeferenced top down raster image. The processor 201 may identify, a boundary of the top surface of each of the one or more objects from the georeferenced top down raster image, based on one or more of a semantic image segmentation deep learning model or at least one standard computer vision filtering technique. In accordance with an embodiment, a semantic image segmentation which is a technique where a neural network may be trained with input images and their corresponding labels, may be employed. These labels are created by manually annotating each pixel of input image into a class. For example, for each of the one or more objects, a data set of a few thousand images may be created. After the completion of training of neural network, the semantic image segmentation technique may predict output of any image.

In accordance with an embodiment, a normal computer vision technique may be used for identifying the one or more pixel corresponds to each of the one or more objects. For example, the techniques like pixel intensity and density thresholding, dilation and erosion may be used followed by a contour detection algorithm to detect the boundary of the pixels representing the one or more objects.

In accordance with an embodiment, the processor 201 may be configured to generate the map data associated with the one or more objects, based on the boundary data of the top surface of each of the one or more objects. To this end, the processor 201 may, for example, determine a median of the top surface of each of the one or more objects. The processor 201 may further determine one or more of a centerline geometry, a start point, or an end point of the top surface of each of the one or more objects, based on the median. Further, the processor 201 may be configured to convert the centerline geometry of each of the one or more objects and the locations representing the start point or the end of the each of the one or more objects into WGS84 or similar geographic coordinate projection system. The location and the centerline geometry of the one or more objects may be transmitted to the database 107 for storage. In this way, the system may lead to generation of updated map data for the region by fusing the map data of the one or more objects with the map data of the region. Thus, end users of the database 107 may be provided with accurate and up to date map data for navigation purposes.

FIGS. 3A-3E illustrate a schematic diagram 300 for an exemplary scenario for implementation of the system 101 to generate the map data associated with the tunnel 301, in accordance with an embodiment of the disclosure. FIGS. 3A-3E are described in conjunction with elements from FIG. 1 and FIG. 2. Hereinafter the user equipment 113, 115 may also be referred to as a vehicle.

Figure 3A:
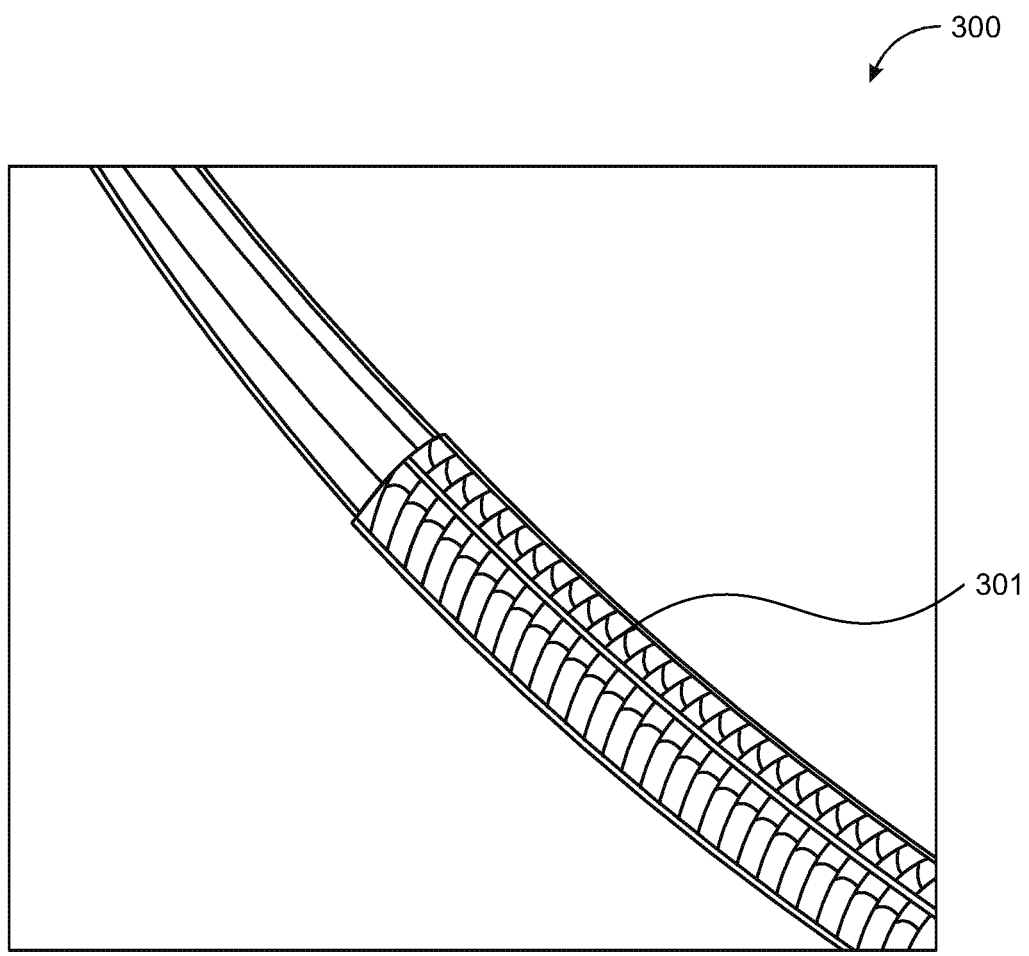

FIG. 3A illustrates an exemplary scenario for generation of map data associated with a tunnel 301 that is a part of a route traversed or to be traversed by a vehicle such as the vehicle 113. For illustrative purpose herein, the generation of map data associated with a tunnel 301 is explained with reference to FIG. 3A. However, the technique explained herein may also applicable for each of the one or more tunnels in a region. In accordance with an embodiment, the map data may include one or more of median of the top surface of the tunnel 301, a centerline geometry of the tunnel 301, a start point, or an end point of the top surface associated with the tunnel 301, direction of travel, and speed limit associated with the tunnel.

In accordance with an embodiment, the point cloud data of a geographic region may be stored in the database 107. The point cloud data may include a list of points containing X, Y and Z coordinates in a Cartesian coordinate system which may be projected to WGS84 or similar geographic coordinate system by using the GPS location of the sensor as a reference.

In accordance with an embodiment, for example, the vehicle 113, 115 may query the mapping platform 103, to navigate a route from a source location to a destination location. The mapping platform 103 may trigger the system 101 to generate map data associated with one or more objects that may be present on the route between the source location to the destination location to provide accurate and reliable navigation assistance. In response to the trigger, the system 101 may divide the route into one or more segments/fragments for faster processing. The system 101 may receive the point cloud data from the database 107 corresponding to each of the one or more segments and determine the map data associated with the one or more objects wherever they may be present.

In accordance with an embodiment, the system 101 may generate a georeferenced top down raster image of the region corresponding to a respective one of the one or more segments, based on the point cloud data. The georeferenced top down raster image of the region is illustrated in FIG. 3A.

The system 101 may filter one or more points of the point cloud data falling below a threshold height from a ground level to obtain height filtered point cloud data. The height filtered point cloud data may comprise points which are above a threshold height from the ground level. Choosing the threshold height may depend upon the type of the one or more objects. Since, the tunnel 301 includes the top surface above the ground level, the threshold height may be chosen in the range of 1 meter to 2 meters from the ground level. Hence, the georeferenced top down raster image may comprise the points above 1 to 2 meters from the ground level. The height filtered point cloud data may comprise the top surface of the one or more tunnels 301. However, any other value may be selected as per the tunnel geometry. In other words, the threshold height may be configurable to optimize the process for best results.

Thus, the georeferenced top down raster image is indicative of a top surface (ceiling) of the tunnel 301. Raster is a form of gridded data that is stored as a grid of values which can be rendered on the system 101 as pixels, where each pixel represents an area of land on the ground. As illustrated in FIG. 3A, the georeferenced top down raster image of the tunnel 301 is shown for using a block size of may be 15 cm×15 cm or may be even lesser or greater depending upon the height of the tunnel 301. As illustrated in FIG. 3A, for example, the georeferenced top down raster image of the tunnel 301 may be represented by a bounding box which may represent as "north": "43.04308432240955", "south": "43.042480557079706", "east": "87.92399168014526", and "west": "−87.92498409748077".

Figure 3B:
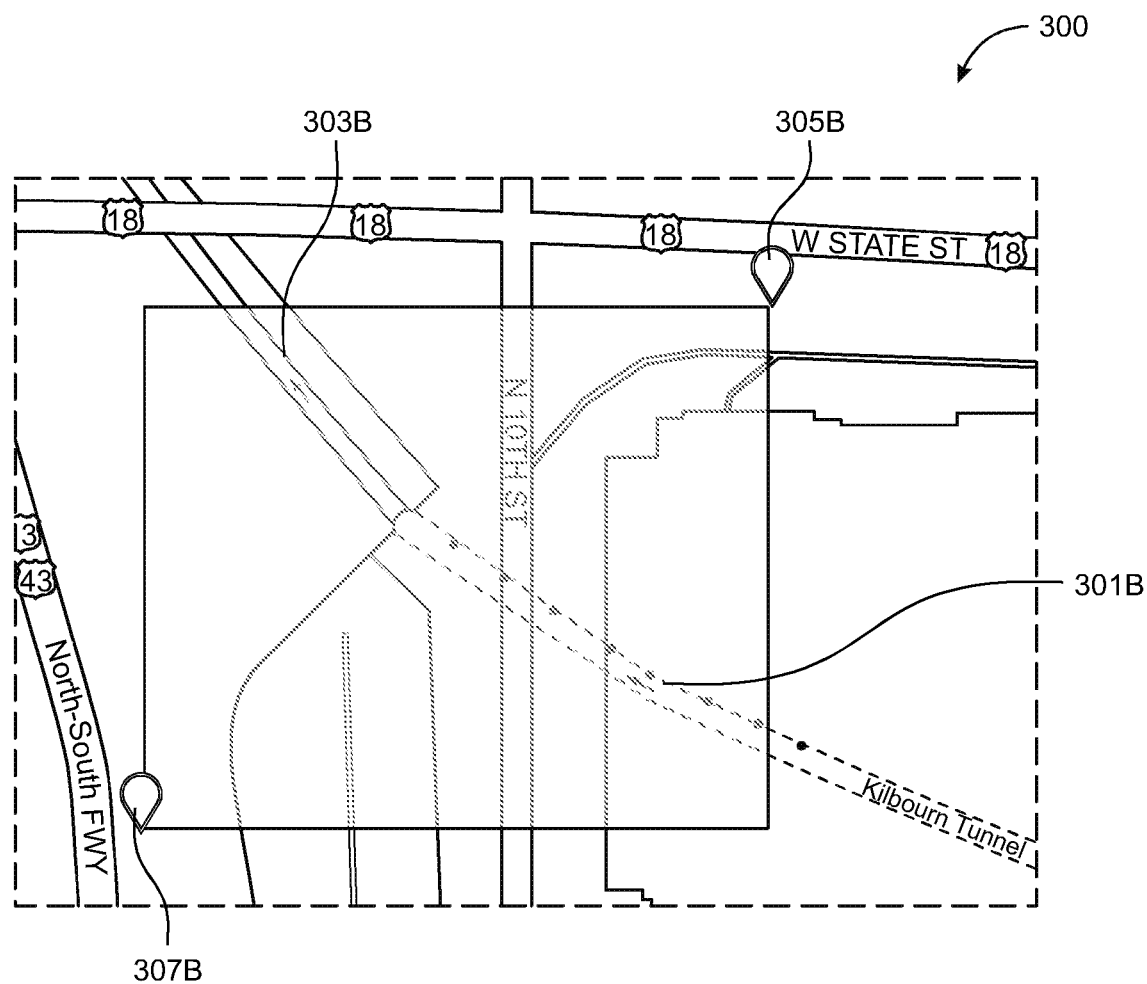

FIG. 3B illustrates the georeferenced top down map image of the tunnel 301 by loading a corresponding map for the bounding box of the raster as illustrated in FIG. 3A. In accordance with an embodiment, point markers 305B, 307B which represents the north east 305B and south west 307B of the bounding box for which the top down raster image in FIG. 3A is generated. The points 301B (indicated in dotted lines) that are falling in the range of 1 meter to 2 meters above the ground level are indicated in FIG. 3B. The filtered points 303B which are falling below 1 to 2 meters from the ground level may be filtered based on the height based filters. The points 303B which are below the threshold height may be filtered using one or more height based filters. The filtered points may represent a roadway surface. The points 301B which are above the ground level may represent the top surface of the one or more tunnel 301.

Figure 3C:
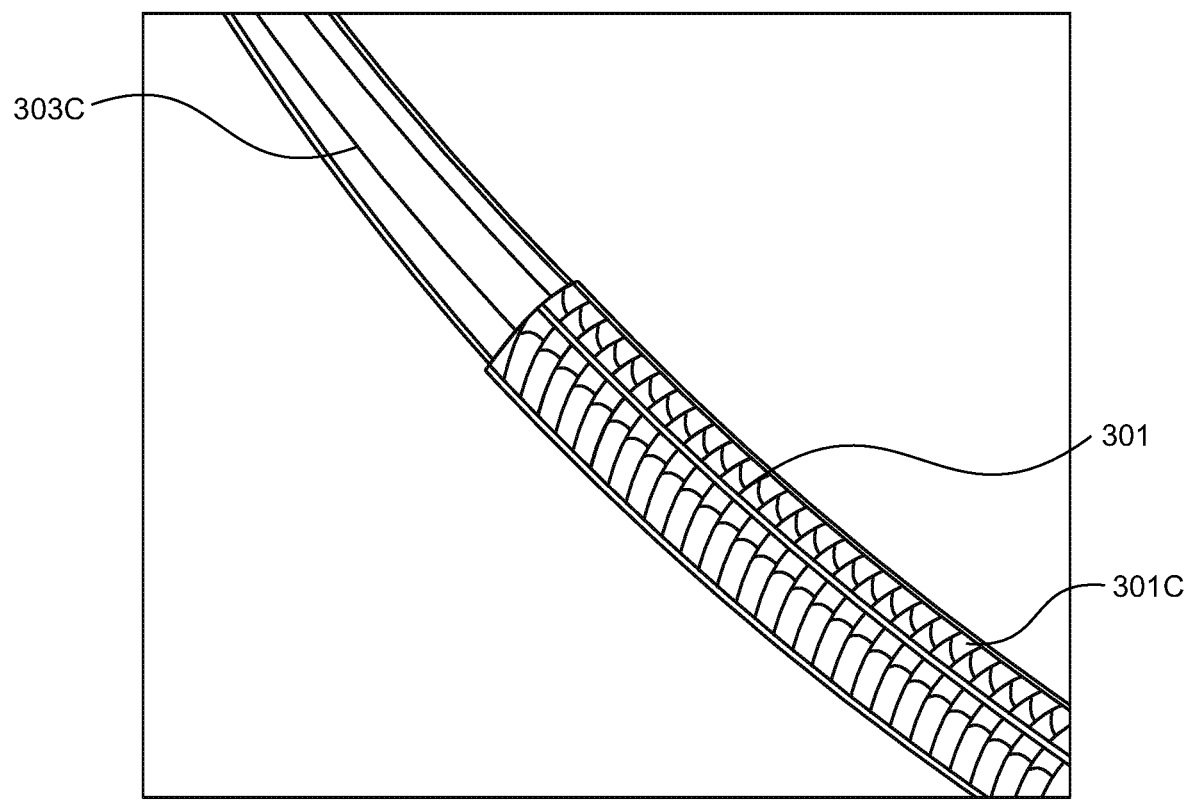

FIG. 3C illustrates the georeferenced top down raster image with the top surface 301C of the tunnel 301 In accordance with an embodiment, the filtered georeferenced top down image may comprise the top surface of the tunnel 301. The roadway surfaces which are falling below a threshold height may be eliminated. Further, the height filtered point cloud data may comprise trees, towers, or building which may be detected and removed, based on one or more suitable image filtering techniques. Thus, the georeferenced top down raster image as illustrated in the FIG. 3C indicates the top surface 301C of the tunnel 301.

Figure 3D:
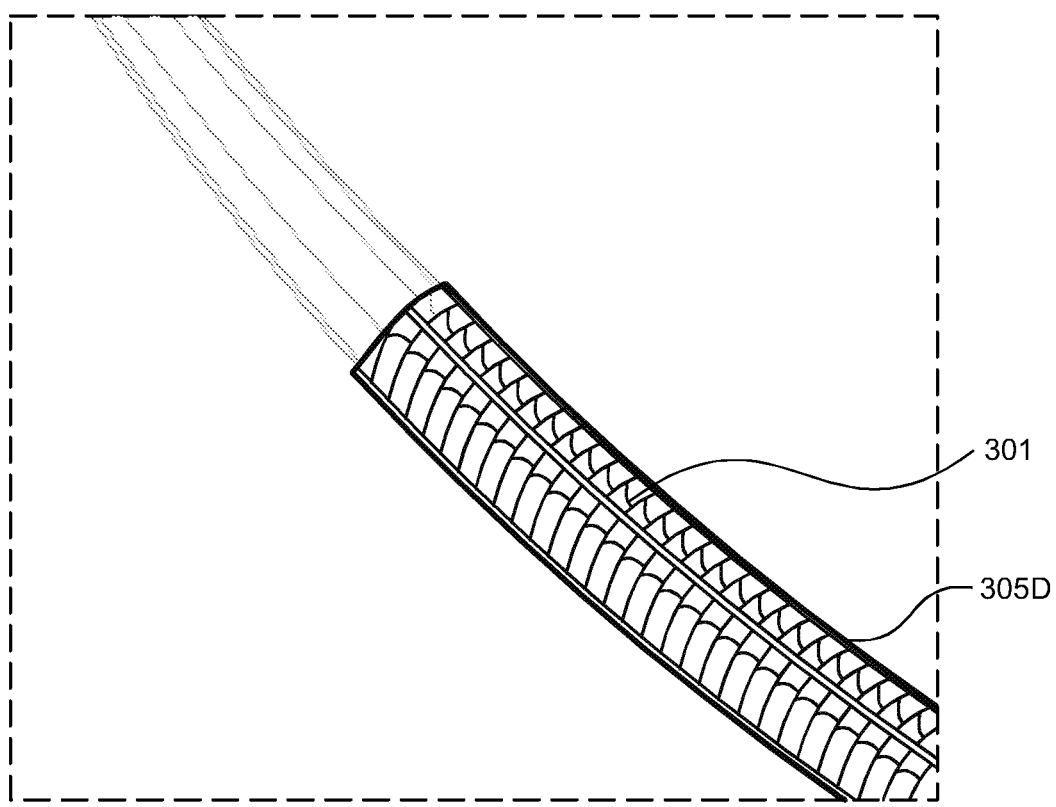

FIG. 3D illustrates the top surface of the tunnel 301 defining the boundary data of the tunnel 301. The system 101 may determine boundary data of the top surface of the tunnel 301, based on the georeferenced top down raster image. The system 101 may identify, a boundary 305D of the top surface of the tunnel 301 from the georeferenced top down raster image, based on one or more of a semantic image segmentation deep learning model or at least one standard computer vision filtering technique. In accordance with an embodiment, referring to FIG. 3D, a boundary polygon may be obtained by the system 101. In some example embodiments, the shape of the boundary may also depend on the shape of top surface of the tunnel 301. As illustrated, the polygon enclosing region represented by the tunnel in the top down raster image may be considered as the boundaries of the tunnel 301. Further, a sample output may be obtained by the system 101 using image segmentation model which was trained to classify pixels representing boundary 305D of the top surface of the tunnel 301 using similar hand labeled images. The model is able to identify the pixels representing the boundary 305D of the tunnel 301. As illustrated in FIG. 3D, the boundary 305D of the tunnel 301 may be identified. The boundary 305D of the top surface of the tunnel 301 may be interpreted as the boundary of the tunnel 301. The boundary data may include for example, geo-coordinates of the start and end of the tunnel 301, width of the tunnel, latitudinal and longitudinal span of the tunnel 301.

Figure 3E:
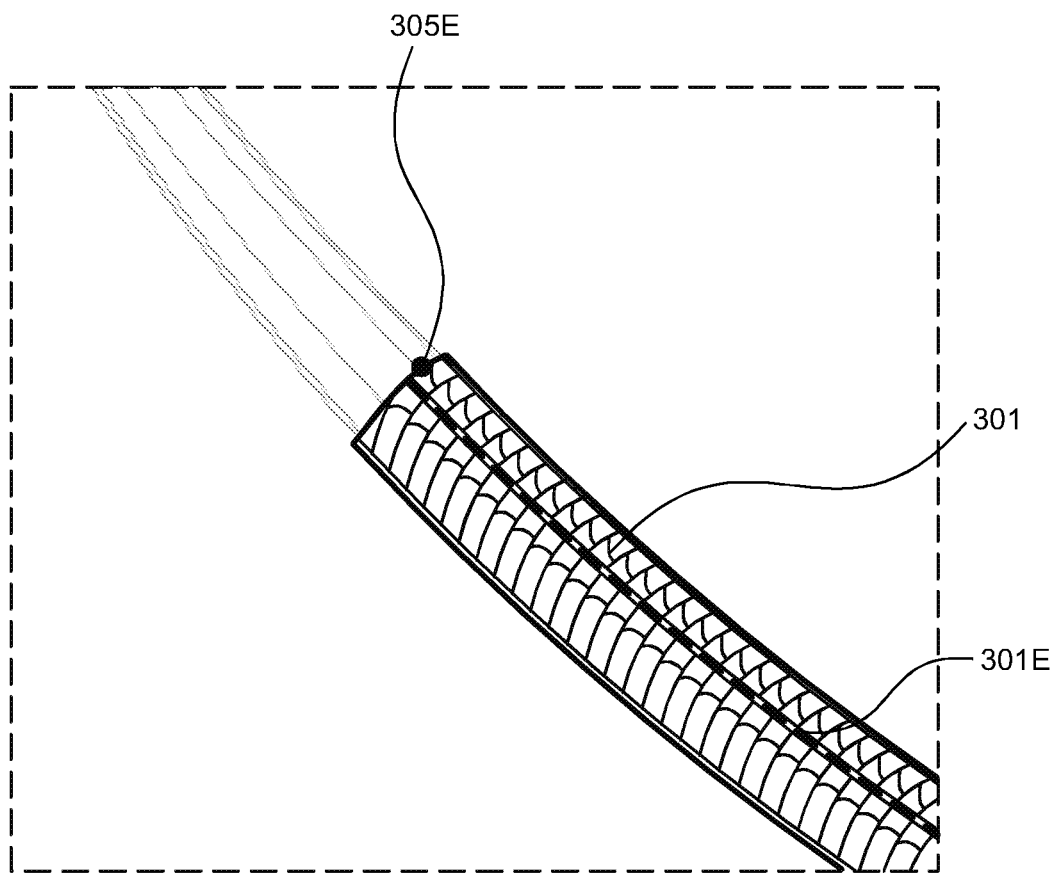

FIG. 3E illustrates the top surface of the tunnel 301 with a centerline geometry 301E of the tunnel 301 in accordance with an embodiment. The system 101 may generate the map data associated with the tunnel 301, based on the boundary data of the top surface of the tunnel 301. The system 101 may determine a median (not shown) of the top surface of the tunnel 301. The median may be determined by skeletonization of the boundary polygon. The system 101 may further determine one or more of the centerline geometry 301E, a start point 305E, or an end point (not shown) of the top surface of each of the tunnel 301, based on the median. The start point 305E or end point of the tunnel 301 provides the indication of the beginning of the tunnel 301. The system 101 may convert the centerline geometry 301E and the locations representing the ends of tunnel 301 into WGS84 or similar geographic coordinate projection system.

In accordance with an embodiment, the system 101 may obtain the GPS probe data of the region. The system 101 may filter the obtained GPS probe data to obtain GPS probe data that is falling outside the boundary polygon. This may be obtained by implementing geo-referencing on the GPS probe data of the region. Thus, the system 101 may obtain the GPS probe data falling within the tunnel 301. The system 101 may determine a trace of one or more devices within the boundary data associated with the tunnel 301, based on the filtered GPS probe data (specific to the geo-coordinates to the tunnel 301). If the traces of the one or more devices are unidirectional, then the tunnel 301 may be considered as one way tunnel. In other words, a vehicle such as the vehicle 113 may travel in the tunnel 301 in only one direction. Similarly, if the traces of the one or more devices are found to be bidirectional, then a vehicle such as the vehicle 113 in the tunnel 301 may travel in both the directions. Thus, the direction of travel for the tunnel 301 may be generated accordingly, as a part of the map data for the tunnel 301.

In accordance with an embodiment, the system 101 may be configured to determine a speed limit associated with the tunnel 301 based on speed data captured in the GPS probe data. The system 101 may for example determine a median speed, $85^{th}$ percentile speed, or other suitable metric for the tunnel 301, based on the GPS probe data and designate the maximum speed for the tunnel 301 accordingly.

In accordance with an embodiment, the system 101 may return to the database 107, the generated map data associated with objects such as the tunnel 301 that may be present on the route between the source location and the destination location. The mapping platform 103 may suitably generate the route information and provide the navigation assistance to an end device.

FIG. 4 illustrates an exemplary scenario for generation of map data associated with a divider 401 that is a part of a route traversed or to be traversed by a vehicle such as the vehicle 113 in accordance with an embodiment of the disclosure. FIG. 4 is described in conjunction with elements from FIG. 1 and FIG. 2.

In accordance with an embodiment, the point cloud data stored in the database 107 or other suitable source may be fetched by the system 101. The system 101 may generate the georeferenced top down raster image of the point cloud data using similar techniques as illustrated in FIG. 3A. Further, the system 101 may filter one or more points of the point cloud data falling below a threshold height from a ground level to obtain height filtered point cloud data using similar techniques as illustrated in FIG. 3B. Since, the divider 401 includes the top surface above the ground level, the threshold height may be chosen in the range of 0.2 meters to 0.75 meters from the ground level. However, the threshold height may be a configurable value that can be defined based on for example, the function class of the road or any other appropriate factor.

In accordance with an embodiment, the system 101 may determine boundary data of the top surface of the divider 401 using similar techniques as illustrated with reference to FIG. 3D.

In accordance with an embodiment, the system 101 may be configured to determine one or more of the centerline geometry, a start point, or an end point of the top surface of each of the divider 401 using similar techniques as illustrated in FIG. 3E. The start point or end point of the divider 401 provides the indication of the beginning or ending of the divider 401.

In accordance with an embodiment, the system 101 may generate map data associated with each of the one or more dividers 401 between the source location and the destination location along with the navigation assistance. The map data may include one or more of median of the top surface of the divider 401, a centerline geometry of the divider 401, a start point, or an end point of the top surface associated with the divider 401.

FIG. 5 illustrates a diagram 500 for an exemplary scenario for implementation of the system 101 to generate the data map data associated with the bridge 501, in accordance with an embodiment of the disclosure. FIG. 5 is described in conjunction with elements from FIG. 1 and FIG. 2.

In accordance with an embodiment, the point cloud data may be stored in the database 107. The system 101 may generate the georeferenced top down raster image from the point cloud data using similar techniques as illustrated with reference to FIG. 3A. In accordance with an embodiment, the system 101 may filter one or more points of the point cloud data falling below a threshold height from a ground level to obtain height filtered point cloud data. Since, the bridge 501 include the top surface above the ground level, the threshold height may be chosen in the range of 1 meter to 2 meters from the ground level.

The system 101 may generate the georeferenced top down raster image of the region, as illustrated in FIG. 5. Thus, the georeferenced top down raster image is indicative of a top surface of each of the one or more bridges 501. The system 101 may determine boundary data of the top surface of the bridge 501, using similar techniques as illustrated in FIG. 3D.

In accordance with an embodiment, the system 101 may be configured to determine one or more of the centerline geometry, a start point, or an end point of the top surface of each of the bridge 501 similarly as illustrated in FIG. 3D and FIG. 3E. The start point or end point of the bridge 501 may provide the indication of the beginning or ending of the bridge 501.

In accordance with an embodiment, the system 101 may be configured to determine a speed limit associated with the bridge 501 based on speed data captured in the GPS probe data. The system 101 may be configured to update the map data of the region with the generated map data of the bridge 501. In accordance with an embodiment, the map data of the bridge 501 may include one or more of median of the top surface associated with the bridge 501, a centerline geometry of the bridge 501, a start point, or an end point of the top surface of the bridge 501, direction of travel, and speed limit associated with the bridge 501.

FIG. 6 exemplarily illustrates a flowchart for implementation of an exemplary method 600 for generating map data associated with one or more objects in a region, in accordance with an example embodiment. It will be understood that each block of the flowchart of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present disclosure and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flowchart 600 support combinations of means for performing the specified functions and combinations of operations for performing the specified functions for performing the specified functions. It will also be understood that one or more blocks of the flowchart 600, and combinations of blocks in the flowchart 600, may be implemented by special purpose hardware-based computer systems which perform the specified functions, or combinations of special purpose hardware and computer instructions.

The method illustrated by the flowchart 600 of FIG. 6 for generating map data associated with the one or more objects in a region includes, at 601, receiving point cloud data associated with the region. A point cloud data is a collection of data points defined by a given coordinates system. In a 3D coordinates system, for instance, a point cloud data may define the shape of some real or created physical objects. The point cloud data may be used to create 3D meshes and other models used in 3D modelling for various fields. Generally, the LiDAR point cloud data may include point measurements from real-world objects or photos for a point cloud that can then be translated to a 3D mesh or NURBS or CAD model. The sensor data (such as point cloud data) from the vehicle 113 may be collected by any device capable of determining the necessary information and providing the necessary information to a remote entity.

Once the point cloud data is received, the method may further include, at 603, generating a georeferenced top down raster image of the region, based on the point cloud data. The georeferenced top down raster image is indicative of a top surface of each of the one or more objects. In some example embodiments, the georeferenced top down raster image may be generated by filtering, one or more points of the point cloud data falling below a threshold height from a ground level, to obtain height filtered point cloud data. The height filtered point cloud data may comprise points falling above a threshold height from the ground level. These points which are falling above the ground level may represent top surface of the one or more objects. The point falling below the threshold height may be eliminated. The georeferenced top down raster image may be generated based on the height filtered point cloud data.

The method may further include, at 605, determining boundary data of the top surface of each of the one or more objects, based on the georeferenced top down raster image. A boundary of the top surface of each of the one or more objects may be identified from the georeferenced top down raster image based on one or more of a semantic image segmentation deep learning model or at least one standard computer vision filtering technique. In some example embodiments, the boundary of the top surface of each of the one or more objects may be identified based on the various other image segmentation technique.

Further, the method may include at 607, generating the map data associated with the one or more objects, based on the boundary data of the top surface of each of the one or more objects. The processor 201 may be configured to determine a median of the top surface of each of the one or more objects. Further, the processor 201 may be configured to determine one or more of a centerline geometry, a start point, or an end point of the top surface of each of the one or more objects. In accordance with an embodiment, the method may further include receiving GPS probe data associated with each of the one or more objects. A trace of one or more devices within the boundary data associated with each of the one or more objects may be determined based on the based on the GPS probe data. Further, a direction of travel associated with each of the one or more objects may be determined based on the trace of the one or more devices.

In accordance with an example embodiment, the method may further include several steps not shown in FIG. 6. For example, the method may include determining a speed limit associated with each of the one or more objects based on speed data captured in the GPS probe data.

In accordance with an embodiment, the method may include obtaining map data of the region. The method may further include updating the map data of the region with the generated map data of the one or more objects.

In an example embodiment, a system 101 for performing the method 600 of FIG. 6 above may comprise a processor (e.g. the processor 201) configured to perform some or each of the operations (601 to 607) described above. The processor 201 may, for example, be configured to perform the operations (601-607) by performing hardware implemented logical functions, executing stored instructions, or executing algorithms for performing each of the operations. Alternatively, the system 101 may comprise means for performing each of the operations described above. In this regard, according to an example embodiment, examples of means for performing operations 601-607 may comprise, for example, the processor 201 and/or a device or circuit for executing instructions or executing an algorithm for processing information as described above.

On implementing the method disclosed herein, the end result generated by the system 105 is a tangible generation of the map data associated with the one or more objects in the region and corresponding update of the database 107. Example embodiments disclosed herein provides an improvement in navigation technology in terms of generation of the map data associated with the one or more objects in the region. The methods and systems disclosed herein use the data provided by probe vehicles and customer vehicles, and perform cloud based processing of such data, using the mapping platform 103 to provide most up to date map data indicating the data associated with one or more objects in the region.

The accuracy of the generation of the map data associated with the one or more objects in the region may depend upon the threshold height from the ground level. Since, the threshold height is a configurable value, embodiments of the present disclosure provide means for determining highly accurate map data for road objects such as tunnels and bridges. The accuracy of the generation of the map data associated with the one or more objects in the region may also depend upon the determining the boundary data of the top surface of each of the one or more objects, determining the traces of the one or more devices, and the received point cloud data. Therefore, by implementing the systems and methods described herein, the generated map data associated with road objects in the region may be highly accurate.

Generally, the method and the system disclosed herein may be used to provide automated generation of the map data associated with road objects (such as tunnel, divider, bridges, flyover etc.) in a region. The invention disclosed herein eliminates the errors of manual geocoding of the one or more road objects (such as tunnel, divider, bridges, flyovers etc.) by automatically detecting road objects. The method and the system 101 disclosed herein may be used for effectively providing daily updates to the map data using a plurality vehicles, such as thousands of customer vehicles.

Many modifications and other embodiments of the inventions set forth herein will come to mind to one skilled in the art to which these inventions pertain having the benefit of the teachings presented in the foregoing descriptions and the associated drawings. The focus is on road features such as tunnels, bridges, dividers, roundabouts but the methods and applications discussed herein can also be applied to other road objects. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for generating map data associated with one or more objects in a region, the system comprising:
   a memory configured to store instructions;
   one or more processors configured to execute the instructions to:
   receive probe data of one or more probe devices traveling over or next to the one or more objects and point cloud data associated with the region, wherein the one or more objects include one or more of a tunnel, a divider, a bridge, a flyover, or a roundabout;
   filter one or more points of the point cloud data falling below a threshold height from a ground level to obtain height filtered point cloud data depending on a type of the one or more objects;
   generate a georeferenced top down raster image of the region, based on the height filtered point cloud data, wherein the georeferenced top down raster image is indicative of a top surface of each of the one or more objects;
   determine boundary data of the top surface of each of the one or more objects, based on the georeferenced top down raster image; and
   generate the map data associated with the one or more objects, based on the probe data and the boundary data of the top surface of each of the one or more objects.

2. The system of claim 1, wherein to determine the boundary data of the top surface of each of the one or more objects, the one or more processors are further configured to identify, a boundary of the top surface of each of the one or more objects from the georeferenced top down raster image, based on one or more of a semantic image segmentation deep learning model or at least one computer vision filtering technique.

3. The system of claim 1, wherein to generate the map data associated with each of the one or more objects, the one or more processors are further configured to determine a median of the top surface of each of the one or more objects.

4. The system of claim 3, wherein the one or more processors are further configured to determine one or more of a centerline geometry, a start point, or an end point of the top surface of each of the one or more objects, based on the median.

5. The system of claim 1, wherein the one or more processors are further configured to:
   determine a trace of the one or more probe devices travelling within the boundary data associated with the one or more objects, based on the probe data; and
   determine a direction of travel associated with each of the one or more objects, based on the trace of the one or more devices.

6. The system of claim 5, wherein the one or more processors are further configured to determine a speed limit associated with each of the one or more objects based on speed data captured in the probe data.

7. The system of claim 1, wherein the one or more processors are further configured to:
   obtain map data associated with the region; and
   update the map data of the region with the generated map data of the one or more objects.

8. A method for generating map data associated with one or more objects in a region, the method comprising:
   receiving probe data of one or more probe devices traveling over or next to the one or more objects and point cloud data associated with the region, wherein the one or more objects include one or more of a tunnel, a divider, a bridge, a flyover, or a roundabout;

filtering one or more points of the point cloud data falling below a threshold height from a ground level to obtain height filtered point cloud data depending on a type of the one or more objects;

generating a georeferenced top down raster image of the region, based on the height filtered point cloud data, wherein the georeferenced top down raster image is indicative of a top surface of each of the one or more objects;

determining boundary data of the top surface of each of the one or more objects, based on the georeferenced top down raster image; and generating the map data associated with the one or more objects, based on the probe data and the boundary data of the top surface of each of the one or more objects.

9. The method of claim 8, wherein determining the boundary data of the top surface of each of the one or more objects further comprises identifying, a boundary of the top surface of each of the one or more objects from the georeferenced top down raster image, based on one or more of a semantic image segmentation deep learning model or at least one standard computer vision filtering technique.

10. The method of claim 8, wherein generating the map data associated with each of the one or more objects further comprises determining a median of the top surface of each of the one or more objects.

11. The method of claim 10, further comprising determining one or more of a centerline geometry, a start point, or an end point of the top surface of each of the one or more objects, based on the median.

12. The method of claim 8, further comprising:
determining a trace of the one or more probe devices travelling within the boundary data associated with the one or more objects, based on the probe data; and determining a direction of travel associated with each of the one or more objects, based on the trace of the one or more devices.

13. The method of claim 12, further comprising determining a speed limit associated with each of the one or more objects based on speed data captured in the probe data.

14. The method of claim 8, wherein the one or more objects include one or more of a tunnel, a divider, a bridge, a flyover, or a roundabout.

15. The method of claim 8, further comprising:
obtaining map data of the region; and
updating the map data of the region with the generated map data of the one or more objects.

16. A non-transitory computer readable medium having stored thereon, computer-executable instructions for causing a computer to execute operations for generating map data associated with one or more objects in a region, the operations comprising:

receiving probe data of one or more probe devices traveling over or next to the one or more objects and point cloud data associated with the region, wherein the one or more objects include one or more of a tunnel, a divider, a bridge, a flyover, or a roundabout;

filtering one or more points of the point cloud data falling below a threshold height from a ground level to obtain height filtered point cloud data depending on a type of the one or more objects;

generating a georeferenced top down raster image of the region, based on the height filtered point cloud data, wherein the georeferenced top down raster image is indicative of a top surface of each of the one or more objects;

determining boundary data of the top surface of each of the one or more objects, based on the georeferenced top down raster image; and generating the map data associated with the one or more objects, based on the probe data and the boundary data of the top surface of each of the one or more objects.

* * * * *